United States Patent [19]
Del Castillo

[11] 3,744,366
[45] July 10, 1973

[54] INDICATING HEAD FOR USE WITH A KEYBOARD INSTRUMENT TEACHING DEVICE

[76] Inventor: Juan M. Del Castillo, Risco 119, Mexico City, Mexico

[22] Filed: Feb. 29, 1972

[21] Appl. No.: 230,287

[52] U.S. Cl. .............................................. 84/478
[51] Int. Cl. ......................................... G09b 15/08
[58] Field of Search ....................... 84/478–480, 482

[56] References Cited
UNITED STATES PATENTS
3,693,493 9/1972 Schmoyer ............................ 84/479

Primary Examiner—Richard B. Wilkinson
Assistant Examiner—Lawrence R. Franklin
Attorney—Karl W. Flocks

[57] ABSTRACT

An indicating head which rests upon a keyboard on a section of the keys thereof which is adapted for use with a reading head. The indicating head extends over a portion of the keyboard and rests directly thereon with the portion containing pilot lights being adjustable for movement to position the lights over specific keys as desired helped by alignment markings on the device.

4 Claims, 3 Drawing Figures

Patented July 10, 1973  3,744,366
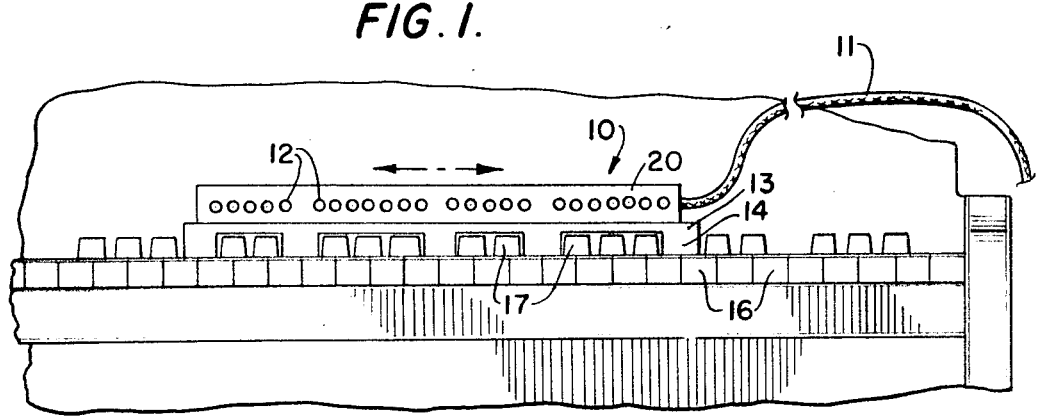
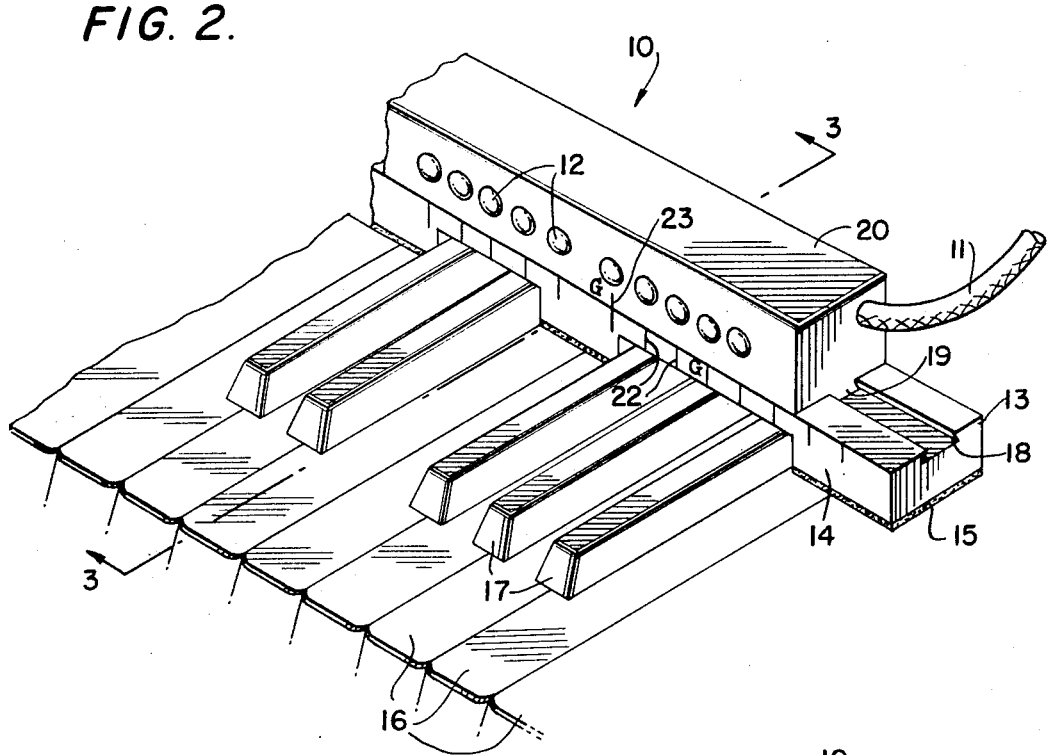
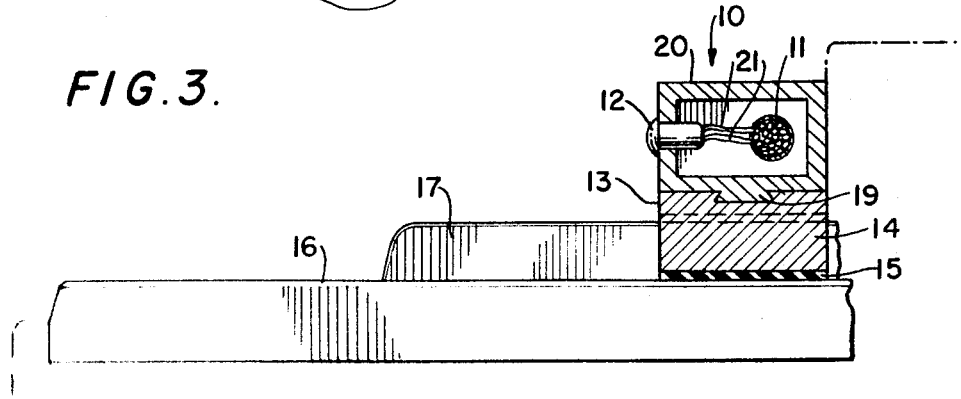

INDICATING HEAD FOR USE WITH A KEYBOARD INSTRUMENT TEACHING DEVICE

BACKGROUND OF THE INVENTION

The present invention relates to the indicating head used with a teaching device to facilitate learning to play melodies on any keyboard driven musical instrument and in particular it relates to an indicating head for use with such teaching device which may be easily mounted on such a keyboard instrument merely by resting the indicating head thereon. A selected musical score used in a reading head which is adapted to be attached to the indicating head of the present invention will activate lights in the indicating head so as to designate the keys as they are to be played thereby allowing a pupil to play the music by following the light. The indicating head of the present invention is of a length to cover only a portion of the keyboard for which a particular exercise is designated. The indicating head rests upon a base which, in turn, is supported directly upon keys of the keyboard and is adjustable so that the pilot lights or indicating lights may be moved so as to be aligned correctly with the keys which will be involved in the exercise.

The prior art has disclosed teaching devices with light designated keys in accordance with some control record sheet or card but in most cases has disclosed structure of an indicating head which requires extensive alterations to the keyboard instrument or must necessarily have been built into the instrument at the time of manufacture. In each case, the indicating head is built for exact fitting to the keyboard, usually to the overall keyboard, for the particular instrument for which it is intended to make use of it.

SUMMARY OF THE INVENTION

It is an object of the present invntion to provide an indicating head for a teaching device which may be placed upon a keyboard for use without any prior attachment thereto.

It is a further object of the present invention that such indicating head be easily adjustable for positioning of indicating lights thereon over the proper keys.

Basically the present invention is adapted for connection to a control means and includes an indicating head having a base resting on the keys of the keyboard musical instrument and a section containing indicating pilot lights with this section adjustable along the base so as to align the indicating lights over the proper keys.

BRIEF DESCRIPTION OF THE DRAWING

The above, as well as further objects and advantages which are inherent in the invention will become apparent from the following description, reference being had to the accompanying drawing, wherein:

FIG. 1 is an elevational view of a portion of the keyboard viewed from the front of the musical instrument with the indicating head of the present invention positioned thereon;

FIG. 2 is an enlarged perspective view of part of FIG. 1 showing a portion of the indicating head and a portion of the keyboard upon which it rests; and FIG. 3 is a partial section view along line 3—3 of FIG. 2 showing an enlarged side sectional view of the indicating head on the keyboard.

DESCRIPTION OF THE PREFERRED EMBODIMENT

Referring first to FIG. 1, there is shown an indicating head 10 of the present invention shown resting on a keyboard of a musical instrument such as a piano or an organ. A cable 11 extending from indicating head 10 is connected to a control or reading head such as those illustrated in my copending application Ser. No. 135,601, filed Apr. 20, 1971. Such a control using a sheet or card or manipulated by an instructor will cause the indicating pilot lights 12 to be lighted in accordance with a sequence of a desired score and with a predetermined timing between indications. Indicating head 10 may be used by itself on a keyboard or may be one of several such indicating heads placed on a keyboard or on the several keyboards such as on organs.

As can be seen no actual attachment of any portion of the indicating head is necessary to the piano or organ and this device may be easily transferred from one musical instrument to another without difficulty or alterations to the musical instrument.

The structure as shown in more detail in the enlarged views of FIGS. 2 and 3 allows adjustability of the indicating head to the keyboard with which it is to be used.

The structure of indicating head 10 includes a base 13 with depending supports 14 having rubber surfaces 15 which rest on keys 16 without any injury or marring thereof. Supports 14 are spaced along the indicating head base 13 so as to extend down and rest on keys 16 only between the groups of raised black keys 17.

Indicating head base 13 contains a longitudinal groove 18 in its upper surface which is adapted to receive a depending dovetailed portion 19 from the indicator portion 20 of indicating head 10.

The indicator portion 20 contains indicating pilot lights 12 mounted in the forward portion thereof and spaced so as to be placed over the keys of a keyboard musical instrument. A pair of wires 21 from each of the pilot lights 12 is attached into cable 11 through which attachment is made to a control for turning on the proper ones of these pilot lights in accordance with a musical score or exercise. Such control is not shown here but is referred to in a copending case previously mentioned.

Alignment marks 22 are found on the indicating head base 13 to be positioned over keys of the musical instrument keyboard and a similar alignment mark 23 on indicator portion 20 is used to help in the proper positioning of the indicator portion 20 on its base 13 by movement of the indicator portion 20 along the groove 18 of base 13. Such alignment marks 22 and 23 may be differently depicted marks such as marks of different colors for settings on different keyboards with the indicator portion 20 easily adjustable upon base 13 to suit the required situation.

It will be obvious to those skilled in the art that various changes may be made without departing from the scope of the invention and the invention is not to be considered limited to what is shown in the drawing and described in the specification.

What is claimed is:

1. An indicating head for placing on the keyboard of a keyboard musical instrument for use with a keyboard teaching device and adapted for attachment to a controlling means comprising a housing, operating indicating means to bring attention to a key determined by the controlling means, said indicating means mounted in said housing in a correspondingly spaced relationship with the keys of the keyboard of the keyboard musical instrument, means to connect and operate said indicating means from the controlling means, a base support means to support said housing having depending portions having their bottom surfaces resting on keys of the keyboard with said depending portions spaced from each other a distance sufficient to include groups of raised keys of the keyboard between them, said housing extending over only a portion of the keyboard of the keyboard musical instrument, and connecting means to connect said housing to said base support means and allow movement of said housing in relation to said base support means in a direction longitudinally of the keyboard of the keyboard musical instrument.

2. The indicating head of claim 1, further characterized by said connecting means including a longitudinal groove in the top surface of said base support means, a depending portion of said housing fitted in said longitudinal groove.

3. The indicating head of claim 1, further characterized by alignment marking means on said housing and said base support means to align said indicators with the keys of the keyboard.

4. The indicating head of claim 1, further characterized by said bottom surfaces having cushioning means supporting said depending portions on the keys.

* * * * *